(12) United States Patent
Panchapakesan et al.

(10) Patent No.: US 10,305,964 B2
(45) Date of Patent: *May 28, 2019

(54) GENERATING CONTENT FRAGMENTS FOR CONTENT DISTRIBUTION

(71) Applicant: AIRWATCH LLC, Atlanta, GA (US)

(72) Inventors: Ramani Panchapakesan, Bangalore (IN); Sachin Vas, Bangalore (IN); Vijaykumar Bhat, Bangalore (IN)

(73) Assignee: Airwatch LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/951,315

(22) Filed: Apr. 12, 2018

(65) Prior Publication Data
US 2018/0234485 A1 Aug. 16, 2018

Related U.S. Application Data

(63) Continuation of application No. 14/862,177, filed on Sep. 23, 2015, now Pat. No. 9,954,930.

(30) Foreign Application Priority Data

Aug. 6, 2015 (IN) .......................... 4095/CHE/2015

(51) Int. Cl.
G06F 15/16 (2006.01)
H04L 29/08 (2006.01)
H04L 29/06 (2006.01)

(52) U.S. Cl.
CPC ............ *H04L 67/06* (2013.01); *H04L 65/602* (2013.01); *H04L 69/04* (2013.01)

(58) Field of Classification Search
CPC ............ H04L 29/0604; H04L 29/0651; H04L 65/607; H04L 67/00–67/06; H04L 67/2828; H04L 69/04
See application file for complete search history.

(56) References Cited

U.S. PATENT DOCUMENTS

| | | | |
|---|---|---|---|
| 6,223,292 B1 | 4/2001 | Dean | |
| 6,910,078 B1 | 6/2005 | Raman | |
| 9,038,116 B1 | 5/2015 | Knox | |
| 9,420,070 B2 | 8/2016 | Chinn | |
| 2002/0010917 A1 | 1/2002 | Srikantan | |
| 2011/0173345 A1 | 7/2011 | Knox | |
| 2013/0159388 A1* | 6/2013 | Forsman | H04N 21/64322 709/203 |
| 2013/0275557 A1 | 10/2013 | Myers | |
| 2014/0089518 A1* | 3/2014 | Zhang | H04N 21/26258 709/231 |

(Continued)

*Primary Examiner* — Brendan Y Higa
(74) *Attorney, Agent, or Firm* — Thomas | Horstemeyer, LLP

(57) ABSTRACT

Disclosed are various examples for serving certain portions of a content file from a server and accessing other portions of the content file from a local storage on a client device. A content proxy can extract a manifest file from a content package, and determine that a content file is associated with the manifest file. Content fragments associated with the content file can be identified and stored in client device storage. Content fragments that are not stored on the client device can be requested from the server. The content proxy can provide a URL that references the content file through which the content file can be served.

20 Claims, 4 Drawing Sheets

(56) References Cited

U.S. PATENT DOCUMENTS

| | | | |
|---|---|---|---|
| 2014/0115724 A1* | 4/2014 | van Brandenburg | G06F 21/10 |
| | | | 726/30 |
| 2014/0280746 A1* | 9/2014 | Johns | H04L 67/06 |
| | | | 709/219 |
| 2014/0325018 A1* | 10/2014 | Ai | H04L 67/06 |
| | | | 709/217 |
| 2014/0358925 A1* | 12/2014 | Jakobowski | G06F 17/30091 |
| | | | 707/737 |
| 2014/0359081 A1* | 12/2014 | Van Deventer | H04N 21/6587 |
| | | | 709/219 |
| 2014/0379871 A1* | 12/2014 | Van Brandenburg | H04L 65/4084 |
| | | | 709/219 |
| 2015/0006662 A1* | 1/2015 | Braness | H04L 65/607 |
| | | | 709/213 |
| 2015/0088965 A1 | 3/2015 | Pakulski | |

* cited by examiner

```
                                              ┌─ 133/151
                          manifest.xml
<?xml version="1.0" encoding="UTF-8"?>
<filename="KeynoteSpeech.video"/> ┌┤─201
<networkLocation>
      <url>http://remotecontent.site/KeynoteSpeechStream</url>  ┤─203
</networkLocation>
<videoSegments>
   <lengthOfVideo>01:30:23</lengthOfVideo> ┌┤─205

<segment seq=1>
     <title>John's Opening Remarks</title>
     <startTime>00:00:00</startTime>
     <endTime>00:05:00</endTime>
     <filename>a1.avi</filename>
   </segment>
                                                  ┤─207
   <segment seq=2>
     <title>Chat Demo</title>
     <startTime>00:25:10</startTime>
     <endTime>00:30:00</endTime>
     <filename>a2.avi</filename>
   </segment>
</videoSegments>
```

FIG. 2

GENERATING CONTENT FRAGMENTS FOR CONTENT DISTRIBUTION

CROSS-REFERENCE TO RELATED APPLICATIONS

This application is a continuation of, and claims priority to, co-pending U.S. Patent Application entitled "Generating Content Fragments for Content Distribution," filed on Sep. 23, 2015, and assigned application Ser. No. 14/862,177, which is incorporated herein by reference in its entirety.

BACKGROUND

Users of client devices in an enterprise environment can have storage accounts whereby files or other content can be stored and synchronized between a client device and a remote storage area, such as on one or more servers that are accessible over a network connection. In some scenarios, a user may store files, such as audio or video files, that consume a large amount of storage space. For various reasons, the user may not wish to download the entirety of files in his or her storage account to the user's devices. For example, the user may have numerous video files stored in his or her storage account in the remote storage area but may not wish to also store all of the video files on a smartphone, tablet, or other device that is synchronized with the remote storage area. Moreover, a user may only be interested in a portion of a file, such as a particular segment of a video, but traditionally would download the entire video and find the relevant portion.

Previous solutions to this problem have allowed a user to specify certain folders or directories from a remote storage area that he or she does not want to synchronize between a remote storage area and the user's device. However, files that are not stored on the user's device must then be retrieved or streamed from the remote storage area in their entireties.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 2 depicts an example manifest file.

DETAILED DESCRIPTION

Examples of this disclosure provide the user with additional control over which files or portions of files in a remote storage area are stored on a device of the user. In one example, a content file, such as a video file, can be broken up into content fragments that are stored on the user's device. The user's device can execute a viewer application that can render content fragments generated from a content file that are stored on the user's device and request portions of the content file from the remote storage area to provide the user with a seamless viewing or listening experience. In other words, the viewer application can render a content file so that from a user's point of view, the entire content file appears to be stored on the user's device. However, the viewer application is actually streaming certain portions of the content file from the remote storage area and accessing other portions of the content file that are locally stored.

Figure 1:
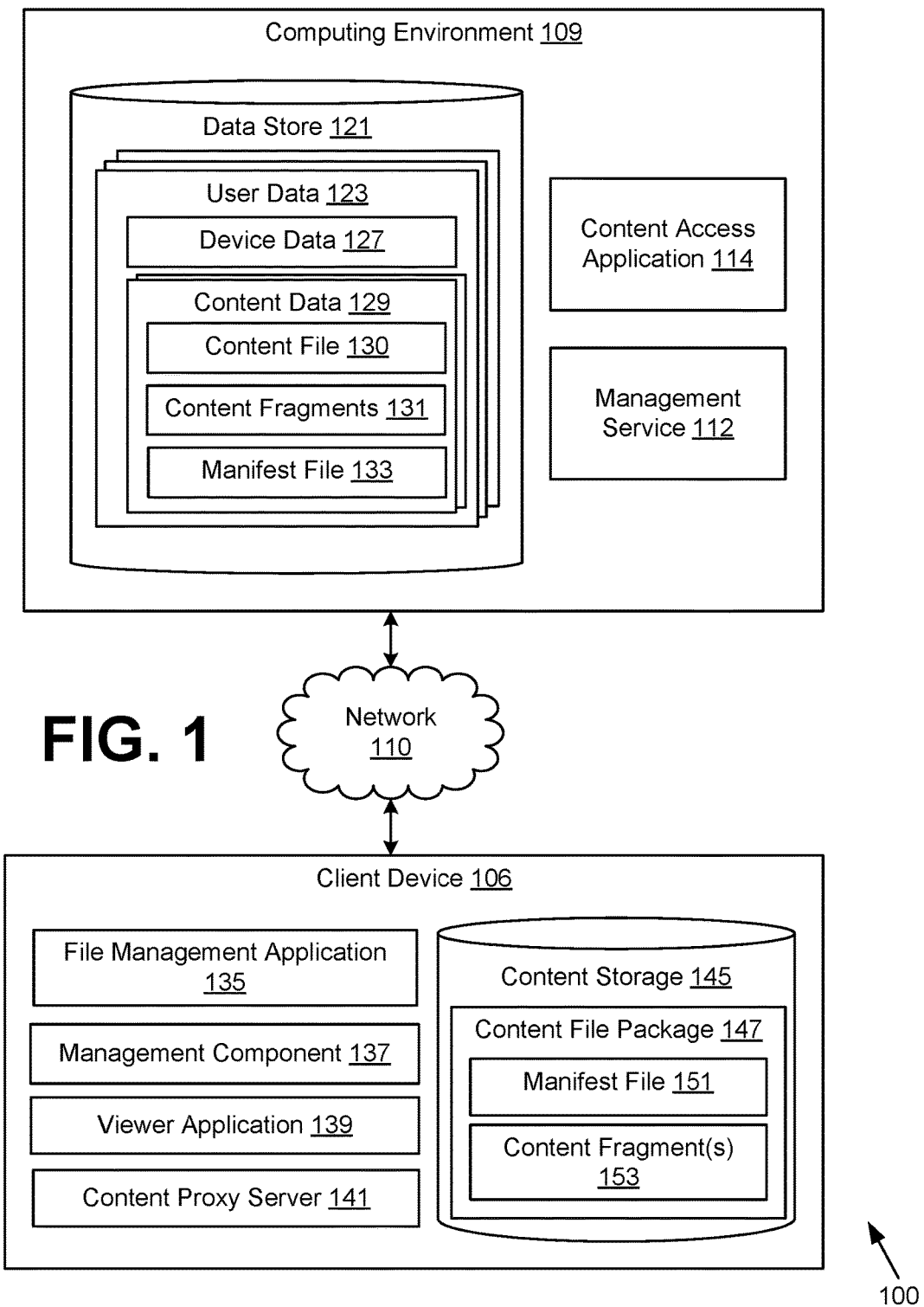
FIG. 1 is a drawing of an example networked environment.

With reference to FIG. 1, shown is a networked environment 100 according to various examples. The networked environment 100 includes a client device 106 and a computing environment 109, which can be in data communication with one another over the network 110. The network 110 includes, for example, the Internet, one or more intranets, extranets, wide area networks (WANs), local area networks (LANs), wired networks, wireless networks, other suitable networks, or any combination of two or more such networks. For example, the networks can include satellite networks, cable networks, Ethernet networks, and other types of networks.

The computing environment 109 can include, for example, a server computer. Alternatively, the computing environment 109 can employ multiple computing devices that can be arranged, for example, in one or more server banks or computing clusters. The computing devices can be located in a single installation or can be distributed among many different geographical locations. For example, the computing environment 109 can include multiple computing devices that together form a hosted computing resource, a grid computing resource, or any other distributed computing arrangement. In some cases, the computing environment 109 can operate as at least a portion of an elastic computing resource where the allotted capacity of processing, network, storage, or other computing-related resources can vary over time. The computing environment 109 can also include or be operated as one or more virtualized computer instances. Generally, the computing environment 109 can be operated in accordance with particular security protocols such that they are considered trusted computing environments. The data stored in the data store 121 is associated with the operation of the various components described below.

The computing environment 109 can execute a management service 112, a content access application 114, or other systems. The management service 112 can manage or oversee the operation of multiple client devices 106. In some examples, an enterprise, such as one or more companies or other organizations, can operate the management service 112 to oversee or manage the operation of the client devices 106 of employees, contractors, or other users within an enterprise environment. In this sense, the client devices 106 are managed devices that are managed by the management service 112.

The management service 112 can ensure that client devices 106 that are managed by the management service 112 operate in compliance with compliance rules. In one scenario, the management service 112 can issue management commands that instruct a client device 106 to take a particular action with respect to a compliance rule. For example, if a client device 106 is designated as lost or stolen, the management service 112 can issue a command instructing the client device 106 to erase data and applications stored on the client device 106. If the management service 112 determines that a client device 106 has violated a compliance rule with respect to having unauthorized modifications or unauthorized applications installed on the client device 106, the management service 112 can issue a command instructing the client device 106 to erase data and applications stored on the client device 106. As another example, the management service 112 can also issue a command instructing the client device 106 to activate a display lock of the client device 106 that requires a user to enter a personal identification number (PIN) in order to use the client device 106. The client device 106 can also store compliance rules locally and enforce compliance rules using a process that is installed on the client device 106.

The content access application 114 can facilitate synchronization of files between one or more data stores 121 and a client device 106 of a user. The content access application 114 can provide access to a remote storage area in which a user can store files and access the stored files from another device, such as a client device 106. The content access application 114 can also generate one or more user interfaces through which a user can access a storage account of the user that is associated with the remote storage area. For example, the user interfaces can be rendered by a browser and allow the user to view, create, edit, store, delete, or perform other operations with respect to files that are stored in one or more data stores 121. A remote storage area can also include other storage locations that are external to the computing environment 109 and accessed by a client device 106.

The content access application 114 can also authenticate a user or a client device 106 to access files and other resources that are housed in the data store 121. The content access application 114 can generate content file packages that correspond to content files stored in the data store 121 in the remote storage area of a user. As will be described in further detail below, a content file package can include content fragments as well as a manifest file that instructs a content proxy server executed by a client device 106 how to interpret the contents of the content file package. The content file package can also be a compressed file archive so that it consumes less storage space than the content file to which it corresponds.

The data stored in the data store 121 includes, for example, user data 123 and potentially other data. User data 123 can include, for example, email, contacts, calendar data, or other data that is associated with a user account that is not depicted in FIG. 1. A user account can be associated with multiple client devices 106. Different client devices 106 associated with a user account can have different user data 123 stored thereon.

Device data 127 can represent data stored in the data store 121 that is associated with client devices 106 that are enrolled with the management service 112 as managed devices. Device data 127 can include a unique device identifier associated with the client device 106, device policies that are associated with a particular client device 106, status information associated with a particular client device 106, and other data that facilitates management of the client device 106 by the management service 112.

Content data 129 represents data regarding files that are stored in a user's storage account or remote storage area of the user. Access to files in a user's remote storage area is facilitated by the management service 112 and content access application 114. For example, a user's access to his or her remote storage area can be authenticated by the management service 112 or content access application 114 based upon authentication credentials provided by a user as well as whether a device from which the user is accessing the remote storage area complies with compliance rules. Content data 129 includes content files 130, which can be files stored in the user's remote storage area. Content files 130 can include documents, audio files, video files, or any other type of file that can be associated with a user's remote storage area. Content files 130 can represent full copies of a file stored in the user's remote storage area or a symbolic link to a copy of the file that is stored in a file repository that is not specifically associated with a particular user. For example, a user can store a file in his or her remote storage area, and the content access application 114 can store the file in a file repository. The content access application 114 can establish a canonical copy of the file in an area of the data store 121 that is not specific to a particular user. The content access application 114 can then establish a symbolic link to the file in the user data 123 of the various users to whom access to the file is granted.

Content data 129, according to examples of the disclosure, further includes content fragments 131 that are associated with a particular content file 130. The content fragments 131 can include different portions of the content file 130. In many scenarios, the content fragments 131 can be less than an entirety of the content file 130. The content fragments 131 can be generated by the content access application 114 in response to a user identifying which portions of a content file 130 that the user wishes to store on a client device 106. The various content fragments 131 can also be associated with a title, section heading, or any other metadata specified by the user. For example, the content access application 114 can present a user interface through which the user can tag certain segments of a video or an audio file that the user wishes to store on the client device 106. As another example, a user may identify certain portions of a document to be stored on the client device 106 while leaving the remaining portions of the document on the data store 121. The remaining portions of the file that are not tagged can be stored in the data store 121 and retrieved by a client device 106 when they are needed for rendering. The content fragments 131 can be stored in the same file format as the content file 130 but represent smaller portions of the content file 130. In another example, the content fragments 131 can be converted into another file format and stored in the data store 121.

In some examples, rather than a user tagging portions of a content file 130 for storage on the client device 106, the content access application 114 can automatically identify certain portions of the content file 130 that should be stored on the client device 106 of a user. The content access application 114 can make this automatic determination based upon a viewing or consumption history of the content file 130 by the user or by other users who may also have access to the content file 130. As another example, an administrator or another user may tag a particular content file 130 to identify the portions of the file that should be stored on the client device 106 of a user who has access to the content file 130.

A content file 130 can also be associated with a manifest file 133. The manifest file 133 can specify metadata associated with the content file 130. The manifest file 133 can also identify content fragments 131 into which the content file 130 has been segmented based upon an identification of which portions of the content file 130 should be stored on the client device 106 and which portions of the content file 130 should remain stored on the data store 121. The manifest file 133 can also identify the length or size of a content file 130, a number of segments into which a content file 130 has been broken into, and other file metadata. The manifest file 133 can also specify the location of the portions of the content file 130 that are not represented by the content fragments 131. The location can include an internet protocol (IP) address or domain name system (DNS) server name along with a path at which the content file 130 can be accessed by the client device 106. The content access application 114 can package the content fragments 131 and the manifest file 133 into a content file package that can be interpreted by the client device 106, as described in further detail below.

The client device 106 is representative of multiple client devices 106 that can be coupled to the network 110. The client device 106 can include, for example, a processor-based system such as a computer system. The computer system can be embodied in the form of a desktop computer, a laptop computer, a personal digital assistant, a mobile phone (e.g., a "smartphone"), a set-top box, a music player, a web pad, a tablet computer system, a game console, an electronic book reader, or any other device with like capability. The client device 106 can include a display as well as one or more input devices, such as a mouse, touch pad, touchscreen, or other input device that facilitates a user input or other types of data input into the client device 106.

The client device 106 can also execute a file management application 135, a management component 137, a viewer application 139, and a content proxy server 141. The client device 106 can also include content storage 145 that can store a local copy of certain content files 130 that are associated with a user's remote storage area. Additionally, according to examples of this disclosure, the content storage 145 can also include one or more content file packages 147, which can include a manifest file 151 and one or more content fragments 153 that correspond to content fragments 131 of a content file 130 from the user's remote storage area. Accordingly, a user can store copies of certain content fragments 153 rather than an entire copy of a content file 130 on the client device 106, which can conserve bandwidth resources as well as storage resources of the client device 106.

The file management application 135 can include one or more programs that access, manage, edit, and/or perform other functions with respect to files. A file can include an image, a video, an audio file, a word processing document, a spreadsheet, or any other type of content. The file management application 135 can also restrict access to one or more of the files depending upon the state of the client device 106 and whether a user of the device is authorized to access the file.

The file management application 135 can allow a user to browse files that are stored on the client device 106 or on the data store 121. The file management application 135 can generate user interfaces that allow the user to launch a viewer application 139 that renders a content file 130.

The management component 137 can monitor or manage at least a portion of the data, applications, or hardware components of the client device 106. The management component 137 can also identify whether the client device 106 is operating in accordance with the one or more compliance rules for one or more device profiles that have been assigned to the client device 106. In some scenarios, the management component 137 can operate as a portion of an operating system for the client device 106. In other scenarios, the management component 137 can function as a device management agent that operates in the application layer of the client device 106 and monitors at least some of the activity being performed in the client device 106. In other examples, the management component 137 can include an application wrapper that interfaces with a software component to facilitate overseeing, monitoring, or managing one or more resources of the client device 106. Alternatively, the management component 137 can be a portion of an application that was developed, for example, using a Software Development Kit (SDK) that facilitates including management functionality within an application that monitors and/or manages at least a portion of the resources for the client device 106.

The management component 137 can be executed by the client device 106 automatically upon startup of the client device 106. Additionally, the management component 137 can run as a background process in the client device 106. Accordingly, the management component 137 can execute without user intervention in some embodiments. Additionally, the management component 137 can communicate with the management service 112 in order to facilitate management of the client device 106. For example, the management component 137 can obtain compliance rules from the management service 112, and the management component 137 can determine whether the client device 106 is operating in accordance with certain compliance rules. In another example, the management component 137 can transmit data that indicates the status of settings for the client device 106, and the management service 112 uses this data to determine whether the client device 106 is operating in accordance with compliance rules. If it is determined that the client device 106 is not in compliance with one or more compliance rules, the management component 137 or the management service 112 can cause a remedial action to be performed. Examples of remedial actions include notifying a user of the device or an administrator of the management service 112, causing device settings to be changed so that the client device 106 becomes compliant with the compliance rules, and erasing data from the client device 106.

The viewer application 139 can render a content file 130 that is associated with a user's remote storage area by generating one or more user interfaces that display the contents of the content file 130. In addition, the viewer application 139 can also generate user interfaces that facilitate editing a content file 130. In various examples, the viewer application 139 can generate a request that is transmitted to the content proxy server 141, which can serve a content file 130 to the viewer application 139 by retrieving content fragments 153 that are stored locally along with portions of the content file 130 that are stored in the data store 121.

The content proxy server 141 represents a server application or server process that is executed by the client device 106. The content proxy server 141 can access the content storage 145 of the client device 106. Accordingly, the content proxy server 141 can access content file packages 147 that correspond to content files 130 associated with a user's remote storage area. The content proxy server 141 can receive a request to retrieve a particular content file 130 from the viewer application 139. For example, as a user browses files that are associated with the user's remote storage area using the file management application 135, the user may attempt to view or launch a content file 130. The file management application 135 can invoke the viewer application 139, which can generate a request to access the content file 130 that is transmitted to the content proxy server 141. In response to receiving the request, the content proxy server 141 can determine whether the requested content file 130 or a content file package 147 is stored in the content storage 145. If neither the content file 130 nor the content file package 147 are stored in the content storage 145, then the content proxy server 141 can initiate a request to retrieve or stream the content file 130 from the content access application 114. The content access application 114 can authenticate the user's access to the content file 130 by determining whether the user associated with the client device 106 is authorized to access the content file 130. If the user is authorized, then the content access application 114 can transmit the content file 130 to the content proxy server 141, which can in turn provide the content file 130 to the viewer application 139.

In either scenario, the file management application 135, in response to receiving a request to launch or render a particular content file 130, can launch the viewer application 139 and provide the viewer application 139 with a uniform resource locator (URL) that points to the content proxy server 141 and references the requested content file 130. The content proxy server 141 can serve the requested content file 130 to the viewer application 139 through the URL by streaming locally stored content fragments 153. When the viewer application 130 requires other portions of the content file 130 that are not locally stored, the content proxy server 141 can retrieve those portions of the content file 130 from the content access application 114 and stream the portions of the content file 130 to the viewer application 139 through the URL. In this manner, although the locations of the content fragments 153 can be either locally or remotely stored, the viewer application 139 can continue to stream a content file 130 through the local URL hosted by the content proxy server 141. The content proxy server 141 can seamlessly obtain the content fragments 153 from the appropriate location and provide them to the viewer application 139.

In another example, the content proxy server 141 can stream content fragments 153 through the URL and redirect the viewer application 139 to the content access application 114 to access portions of the content file 130 that are not stored locally. The content access application 114 can also redirect the viewer application 139 to the content proxy server 141 when the viewer application 139 reaches a portion of the content file 130 that is stored locally. In this scenario, the viewer application 139 is configured to obtain portions of the content file 130 from the content proxy server 141 and the content access application 114 depending upon the portion of the content file that the viewer application 139 is rendering. In the previous example, the content proxy server 141 can handle retrieving the content fragments 153 and retrieving the content file 130 from the content proxy server 141 for portions of the content file 130 that are not stored locally on behalf of the viewer application 139.

Additionally, in response to receiving a request to stream or transmit the content file 130 to the content proxy server 141, the content access application 114 can determine the requested portion of the content file 130 and initiate streaming of the content file 130 to the content proxy server 141. In another example, the content proxy server 141 can provide a timecode along with the request to stream a content file 130 in the case of an audio or video file. The content access application 114 can extract the timecode from the request and initiate a stream of the content file 130 from the timecode indicated in the request. In the case of a document or another type of content file 130 that does not have a time component, the request from the content proxy server 141 can identify a page number, section number, or any other indicator of which portion of the content file 130 that is being requested by the content proxy server 141. In this scenario, the viewer application 139 can identify a page number, section number or other indication of the portion of the content file 130 that it is rendering or that the user is viewing on the client device 106. For example, as a user pages or scrolls through a document using the viewer application 139, the viewer application 139 can request the page or portion of the document that it requires from the content proxy server 141 in order to render the portion of the document on the client device 106.

In response to receiving a request for a content file 130 from the content proxy server 141, the content access application 114 can initiate streaming of the file from a requested timecode, page number, or other indication of which portion of the content file 130 is requested. In some examples, the request can include a beginning and an end of the portion of the content file 130 that is requested. In this scenario, the content access application 114 can initiate a stream of the content file 130 to the content proxy server 141 and cease transmission of the content file 130 upon reaching the end of the portion of the content file 130 that is requested. In another example, the content access application 114 can provide the entire content file 130 to the content proxy server 141 in response to the request for the content file 130 from the content proxy server 141.

In the event that a requested content file package 147 is stored in the content storage 145, the content proxy server 141 can interpret the manifest file 151 to determine which content fragments 153 are stored in the content storage 145 and which portions of the content file 130 are not stored on the client device 106. The content proxy server 141 can stream content fragments 153 corresponding to the content file 130 to the viewer application 139 from the content storage as well as portions of the content file 130 that are stored in the computing environment 109. In this way, the content proxy server 141 acts as a proxy for access to a content file 130 on behalf of the viewer application 139.

If the viewer application 139 is playing a portion of the content file 130 for which content fragments 153 are stored locally, the content proxy server 141 can stream the content fragments 153 from the content storage 145. If the viewer application 139 is playing a portion of the content file 130 for which no content fragments 153 are stored locally, the content proxy server 141 can obtain those portions of the content file 130 from the content access application 114 and transmit them to the content proxy server 141, which can relay those portions of the content file 130 to the viewer application 139. In this way, from the standpoint of the viewer application 139, the content file 130 is obtained from the content proxy server 141 without regard to whether portions of the file are stored in content storage 145 or in the data store 121.

Referring next to FIG. 2, shown is one example of a manifest file 133. The manifest file 133 can be encoded in extensible markup language (XML) or in any other data format in which structured or unstructured data can be embedded. In the example manifest file 133 shown in FIG. 2, a filename indicator 201 can identify a filename of the content file package 147 to which the manifest file 133 corresponds. A network location indicator 203 can indicate a network location of the content file 130, such as a network address of the computing environment 109 executing the content access application 114. A length indicator 205 can indicate a length of a video that corresponds to the content file 130. Finally, content fragment indicators 207 can identify information about content fragments 153 that are stored in content storage 145 so that the content proxy server 141 can retrieve content fragments 153 upon request from the viewer application 139.

Figure 3:
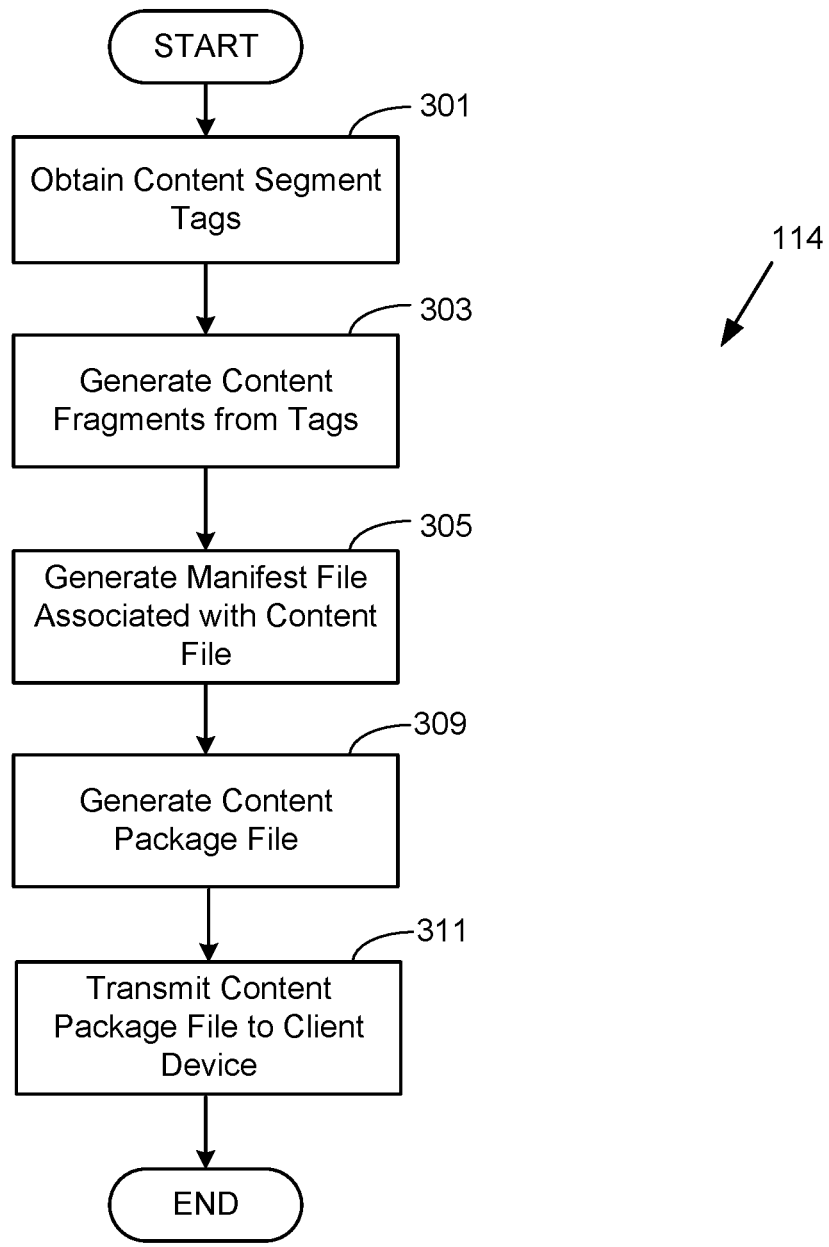
FIGS. 3-4 depict example flowcharts.

Referring next to FIG. 3, shown is a flowchart that provides one example of the operation of the content access application 114. As an alternative, the flowchart of FIG. 3 can be viewed as depicting an example of elements of a method implemented in the computing environment 109. Functionality attributed to the content access application 114 can be implemented in a single process or application executed by the computing environment 109 or in multiple processes or applications. The separation or segmentation of functionality as discussed herein is presented for illustrative purposes only.

FIG. 3 illustrates an example of the content access application 114 generating a content file package 147 that contains content fragments 131 associated with a content file 130. The content fragments 131 can be generated based upon a user's indication of which portions of a content file 130 that the user wishes to store on the client device 106. Beginning with step 301, the content access application 114 can obtain content segment tags that specify the portions of a content file 130 that the user wishes to store on the client device 106. Content segment tags can be obtained from a user interface in which a user identifies certain segments of a content file 130 as segments that are desired to be stored on the client device 106. The content segment tags can also be obtained by an analysis of a content file 130 based upon a consumption history associated with the content file 130. In one example, portions of a content file 130 that the user previously viewed or consumed can be tagged, while portions of the content file 130 that the user has not previously viewed or consumed can be skipped. The consumption history of a population of users who may also have access to the content file 130 can also be considered when generating content segment tags. Content segment tags can identify portions of the content file 130 according to a timecode, page number, section number, or any other indication of a portion of the content file 130 that is desired to be stored on the client device 106.

At step 303, the content access application 114 can generate content fragments 131 based upon the content segment tags. The content fragments 131 can include portions of the content file 130 that are to be included in a content file package 147 that is transmitted to the client device 106. In the case of a video or audio file, the content fragments 131 can include smaller video files or audio files that correspond to the portions of the content file 130 that are identified by the content segment tags. In the case of a document, the content fragments 131 can be a file formatted in the original document format as the content file 130 with the portions of the content file 130 that are not desired for storage on the client device 106 removed from the file.

At step 305, the content access application 114 can generate a manifest file 133 corresponding to the content fragments 131. As described above, the manifest file 133 can identify the content fragments 131 as well as specify a quantity of content fragments 131 and their location within the content file 130. Additionally, the content access application 114 can also generate a filename that corresponds to a content file package 147 in which the content fragments 131 and manifest file 133 are packaged. At step 309, the content access application 114 can generate a content file package 147 that incorporates the manifest file 133 and the content fragments 131 that are designated for storage in content storage 145 on the client device 106. At step 311, the content access application 114 can transmit the content file package 147 to the client device 106 for storage in content storage 145.

Figure 4:
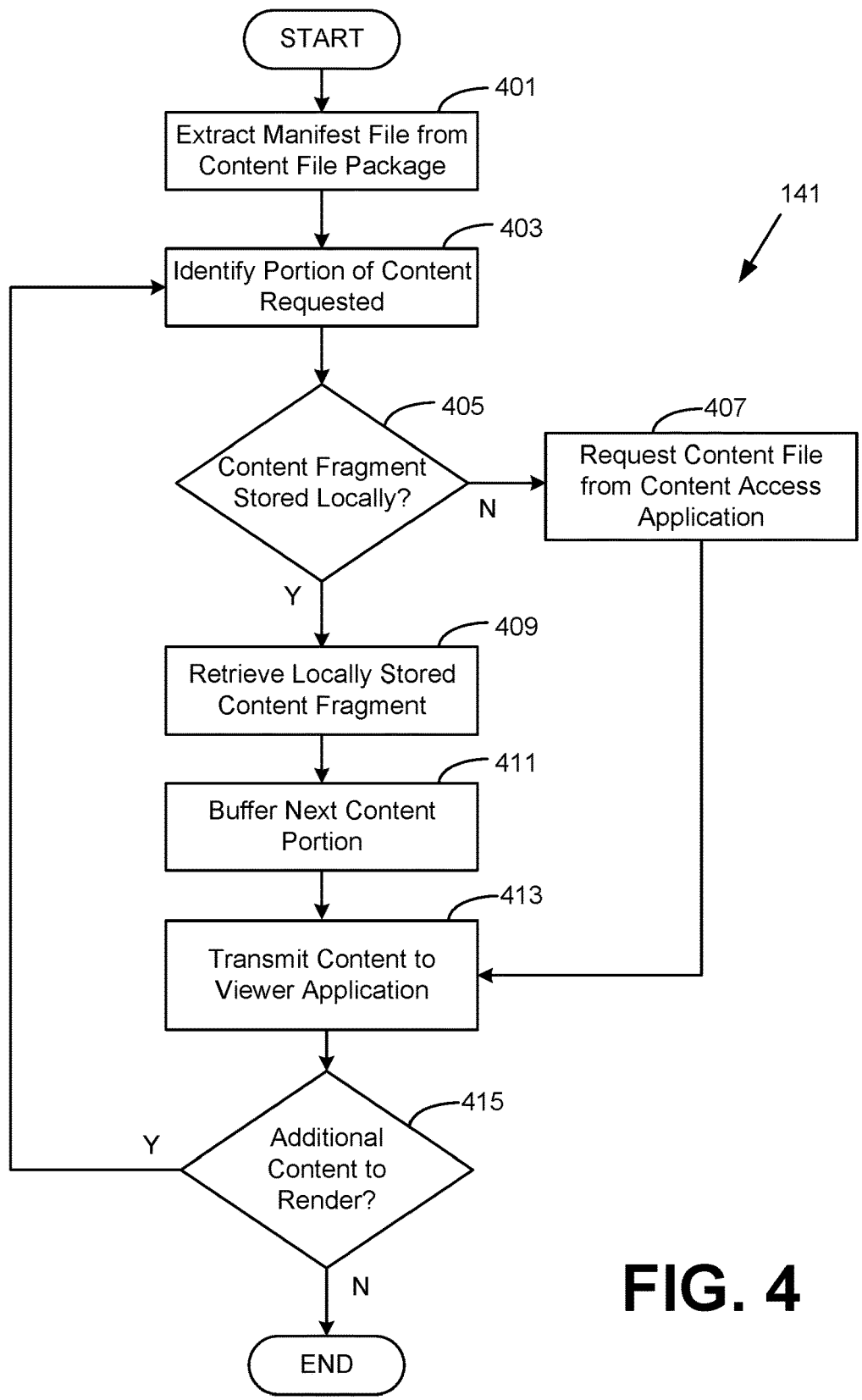

Referring next to FIG. 4, shown is a flowchart that provides one example of the operation of the content proxy server 141. As an alternative, the flowchart of FIG. 4 can be viewed as depicting an example of elements of a method implemented in the client device 106. Functionality attributed to the content proxy server 141 can be implemented in a single process or application executed by the computing environment 109 or in multiple processes or applications. The separation or segmentation of functionality as discussed herein is presented for illustrative purposes only.

FIG. 4 illustrates an example of how the content proxy server 141 can handle a request for a content file 130 from a viewer application 139 executed by the client device 106. In one example, the viewer application 139 can be provided with a URL at which the content proxy server 141 can be reached. The URL can be provided by the file management application 135 in response to a user's request to launch or view a particular content file 130 associated with the user's storage area. The request can be directed toward a network port associated with a server process associated with the content proxy server 141. A viewer application 139 that is provided a content file 130 in other solutions is merely provided a reference to a file storage location on the client device 106. However, in examples of this disclosure, the viewer application 139 is provided with a URL that points to the content proxy server 141.

Accordingly, at step 401, the content proxy server 141 can extract a manifest file 151 from a content file package 147 that corresponds to a requested content file 130 requested. At step 403, the content proxy server can identify a portion of the content that is requested by the viewer application 139. For example, a user may view a video file from the beginning of the video or seek to another portion of the video. In response to these user inputs, the viewer application 139 can generate a request for a timecode of the video that it is rendering and transmit the request to the content proxy server 141 for a particular portion of the video.

At step 405, the content proxy server 141 can determine whether the requested portion of the content file 130 is stored in content storage 145 as a content fragment 153. The content proxy server 141 can analyze the manifest file 151 to determine whether a content fragment 153 specified by the manifest file 151 corresponds to the requested portion of the content file 130. If the requested portion of the content file 130 is not stored on the client device 106, at step 407, the content proxy server 141 can request the portion of the content file 130 from the content access application 114. The content access application 114 can stream the content file 130 to the content proxy server 141 from a requested starting point or transmit the entire content file 130. At step 413, the content proxy server 141 can transmit the content to the viewer application 139 for rendering.

If, at step 405, the requested portion of the content file 130 is stored in content storage 145 as a content fragment 153, the content proxy server 141 can then retrieve the content fragment 153 from content storage 145 at step 409. In some examples, at step 411, the content proxy server 141 can also buffer the next portion of the content file 130. For example, the content proxy server 141 can retrieve subsequent portions from the content access application 114. In these scenarios, the content proxy server 141 can store these portions of the content file 130 in content storage 145 as additional content fragments 153 or as cached portions of the content file 130. As playback continues, the viewer application 139 will seamlessly play the segments, whether stored locally or remotely.

At step 413, the content proxy server 141 can transmit the requested content to the viewer application 139. At step 415, the content proxy server 141 can determine whether the viewer application 139 requires additional portions of the content file 130. If so, then the process returns to step 403. In this way, the viewer application 139 can be provided with a URL that points to the content proxy server 141 through which the content file 130 can be streamed by the viewer application. The content proxy server 141 can handle retrieving content fragments 153 that are stored locally and portions of the content file 130 that are stored in the data store 123. The process shown in FIG. 4 can support streaming a content file 130 to a viewer application 139 that need not be configured with logic that takes into account where the content file 130 is stored because the viewer application 139 is only provided a URL that points to the content proxy server 141. If there are no additional portions of the content file 130 required by the viewer application 139 at step 415, then the process can proceed to completion.

The flowcharts of FIGS. 3-4 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The client device 106, computing environment 109, or other components described herein can include at least one processing circuit. The processing circuit can include, for example, one or more processors and one or more storage devices that are coupled to a local interface. The local interface can include a data bus with an accompanying address/control bus or any other suitable bus structure.

The one or more storage devices for a processing circuit can store data or components that are executable by the one or more processors of the processing circuit. For example, the management service 112, content access application 114, content proxy server 141, or other components can be stored in one or more storage devices and be executable by one or more processors. Also, a data store, such as the data store 121 can be stored in the one or more storage devices.

The management service 112, content access application 114, content proxy server 141, or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system, such as a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

The above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A non-transitory computer-readable medium for a client device to render locally and remotely stored content using a content proxy embodying a program executable in a computing device, the program, when executed by the computing device, being configured to cause the computing device to at least:
   extract a manifest file from a content file package corresponding to a content file;
   identify, based on the manifest file, content fragments designated for local storage, the content fragments associated with segments of the content file, and the content fragments comprising less than an entirety of the content file; and
   provide a uniform resource locator (URL) that references the content file through which the content file can be served.

2. The non-transitory computer-readable medium of claim 1, wherein the program is further configured to:
   identify, based on the manifest file, a remainder of content fragments designated for remote storage; and
   provide, in response to a request received at the URL, at least one of the content fragments from the local storage and at least one of the content fragments from the remote storage.

3. The non-transitory computer-readable medium of claim 2, wherein the content file package comprises a compressed archive containing at least one of the content fragments and the manifest file.

4. The non-transitory computer-readable medium of claim 2, wherein the program is further configured to extract at least one of the content fragments from the content file package.

5. The non-transitory computer-readable medium of claim 1, wherein the program is further configured to:
   identify, based on the manifest file, a remainder of content fragments designated for remote storage;
   provide, in response to a request received at the URL, at least one of the content fragments from the local storage; and
   redirect the request to a server to obtain the remainder of the content fragments from the server.

6. The non-transitory computer-readable medium of claim 5, wherein the request comprises at least one timecode associated with the content file.

7. The non-transitory computer-readable medium of claim 1, wherein the program is further configured to:
identify, based on the manifest file, a remainder of content fragments designated for remote storage;
buffer at least one of the remainder of the content fragments from the remote storage; and
provide, in response to a request received at the URL, at least one of the content fragments from the local storage.

8. A system for a client device to render locally and remotely stored content using a content proxy, comprising:
a computing device; and
a content proxy executable by the computing device, the content proxy configured to cause the computing device to at least:
extract a manifest file from a content file package corresponding to a content file;
identify, based on the manifest file, content fragments designated for local storage, the content fragments associated with segments of the content file, and the content fragments comprising less than an entirety of the content file; and
provide a uniform resource locator (URL) that references the content file through which the content file can be served.

9. The system of claim 8, wherein the content proxy is further configured to:
identify, based on the manifest file, a remainder of content fragments designated for remote storage; and
provide, in response to a request received at the URL, at least one of the content fragments from the local storage and at least one of the content fragments from the remote storage.

10. The system of claim 9, wherein the content file package comprises a compressed archive containing at least one of the content fragments and the manifest file.

11. The system of claim 9, wherein the content proxy is further configured to cause the computing device to extract at least one of the content fragments from the content file package.

12. The system of claim 8, wherein the content proxy is further configured to cause the computing device to:
identify, based on the manifest file, a remainder of content fragments designated for remote storage;
provide, in response to a request received at the URL, at least one of the content fragments from the local storage; and
redirect the request to a server to obtain the remainder of the content fragments from the server.

13. The system of claim 12, wherein the request comprises at least one timecode associated with the content file.

14. The system of claim 8, wherein the content proxy is further configured to cause the computing device to:
identify, based on the manifest file, a remainder of the content fragments designated for remote storage;
buffer at least one of the remainder of the content fragments from the remote storage; and
provide, in response to a request received at the URL, at least one of the content fragments from the local storage.

15. A method for a client device to render locally and remotely stored content using a content proxy, comprising:
extracting a manifest file from a content file package corresponding to a content file;
identifying, based on the manifest file, content fragments designated for local storage, the content fragments associated with segments of the content files, the content fragments comprising less than an entirety of the content file; and
providing a uniform resource locator (URL) that references the content file through which the content file can be served.

16. The method of claim 15, further comprising:
identifying, based on the manifest file, a remainder of content fragments designated for remote storage; and
providing, in response to a request received at the URL, at least one of the content fragments from the local storage and at least one of the content fragments from the remote storage.

17. The method of claim 16, wherein the content file package comprises a compressed archive containing at least one of the content fragments and the manifest file.

18. The method of claim 15, further comprising:
identifying, based on the manifest file, a remainder of content fragments designated for remote storage;
providing, in response to a request received at the URL, at least one of the content fragments from the local storage; and
redirecting the request to a server to obtain the remainder of the content fragments from the server.

19. The method of claim 18, wherein the request comprises at least one timecode associated with the content file.

20. The method of claim 15, further comprising:
identifying, based on the manifest file, a remainder of the content fragments designated for remote storage;
buffering at least one of the remainder of the content fragments from the remote storage; and
providing, in response to a request received at the URL, at least one of the content fragments from the local storage.

* * * * *